(12) United States Patent
Casey (10) Patent No.: US 7,274,779 B2
(45) Date of Patent: Sep. 25, 2007

(54) TELEPHONE TO TELEPHONE DATA PASSING SYSTEM

(75) Inventor: Steven M. Casey, Littleton, CO (US)

(73) Assignee: Qwest Communications International, Inc., Denver, CO (US)

( * ) Notice: Subject to any disclaimer, the term of this patent is extended or adjusted under 35 U.S.C. 154(b) by 0 days.

(21) Appl. No.: 10/903,915

(22) Filed: Jul. 30, 2004

(65) Prior Publication Data
US 2006/0023852 A1 Feb. 2, 2006

(51) Int. Cl.
H04M 11/00 (2006.01)

(52) U.S. Cl. .............................. 379/93.18; 379/93.26; 379/93.27

(58) Field of Classification Search ............ 379/93.27, 379/93.08, 93.17, 93.23, 93.26, 52
See application file for complete search history.

(56) References Cited

U.S. PATENT DOCUMENTS

| | | | | |
|---|---|---|---|---|
| 3,824,347 A * | 7/1974 | Sorber et al. ............ | 379/93.08 |
| 5,655,961 A * | 8/1997 | Acres et al. ................. | 463/27 |
| 5,835,574 A | 11/1998 | Lam | |
| 6,075,842 A * | 6/2000 | Engelke et al. ................ | 379/52 |
| 6,498,835 B1 | 12/2002 | Skladman et al. | |
| 6,631,188 B1 | 10/2003 | Sands | |
| 6,751,303 B1 * | 6/2004 | Cook ....................... | 379/93.27 |
| 6,771,751 B1 * | 8/2004 | Kasturi et al. ........... | 379/93.27 |
| 6,873,861 B2 * | 3/2005 | Awada et al. ................ | 455/566 |
| 2002/0172193 A1 * | 11/2002 | Preston et al. .............. | 370/352 |

OTHER PUBLICATIONS

*Dual-tone Multi-frequency*, http://www.fact-index.com/d/du/dual_tone_multi_frequency.html, Nov. 2, 2004, 2 pages.
Frank Durda IV, *Dual Ton Multi-Frequency (Touch-Tone®) Reference*, http://nemesis.lonestar.org/reference/telecom/signaling/dtmf.html, Nov. 2, 2004, 4 pages.
*Dual-tone multi-frequency*, htt;://www.brainyencyclopedia.com/encyclopedia/d/du/dual_tone_multi_frequency.html, Nov. 2, 2004, 4 pages.

* cited by examiner

*Primary Examiner*—Stella Woo
(74) *Attorney, Agent, or Firm*—Townsend and Townsend and Crew LLP (57) ABSTRACT

Various embodiments of the invention provide methods and systems for sending data in-band over a telecommunications network during an active call. Some embodiments provide a telephone user with a way to send alphanumeric data from his or her phone to a receiving party's phone, when the user and the receiving party are engaged in an active telephone call.

37 Claims, 4 Drawing Sheets

Process Flow:

① Phone call to a another phone. Connection established and conversation in progress ② Phone sends another phone number or other data to second phone ③ Second phone receives the DTMF tones. Converts them to numbers then stores them in the phone

FIGURE 4

TELEPHONE TO TELEPHONE DATA PASSING SYSTEM

BACKGROUND OF THE INVENTION

The present invention relates generally to the field of exchanging data using telephone communication systems. More specifically, the present invention relates to sending data from one telephone to another over a telephone network during an active call.

As patented by Alexander Graham Bell, the original telephone was a device that could transmit speech electrically over a telephone network. Accordingly, original telephone communication systems were designed and used for verbal interaction between two callers, the call sender and the call receiver.

Telephone communication systems, however, have advanced greatly since Alexander Graham Bell's original system and since the 1950s there has been a growing demand for data transmission across the telephone networks. This increased data transmission can be achieved on analogue lines using a modem, but since the lines have been developed with speech as the primary traffic the bandwidth is limited and data transmission speeds have to be reduced to maintain correct transmission. The theoretical maximum uncompressed speed of an analogue line is 30 Kbps (30,000 bits per second), though for practical purposes the maximum is 28.8 Kbps above which transmission becomes unreliable. Data compression and digital network technology are methods that have been used to increase data transmission rates over existing telecommunication networks.

As well as the rapid improvements in data transmission over telecommunication networks, modern telephones are now designed to incorporate systems for data transmission, other then oral communication. i.e., paging and text messaging systems. With these systems, a person may use a modern telephone as a data transmitter to send non-verbal data, including numeric and textual data, to another person's telephone. For purposes of this patent application, the term "data" is used to denote any data communicated over the telephone communications system that is not communicated verbally, for example, alphanumeric data such as phone numbers and email addresses.

Data can be transmitted over a telecommunication network either "in-band" or "out-band". In-band data transmission is achieved through the telephony voice channel, while out-band is communicated through some other type of communication channel. Terminal equipment used today is generally in-band with the exception of ISDN devices. Out-band data transmission is usually used between telephone switches for security and performance reasons.

Data transmission in telephone systems typically uses tone signaling for the in-band terminal equipment, communicating in both directions. The best-known scheme for terminal equipment to network signaling is DTMF (Dual Tone Multi-Frequency), whereby the terminal equipment generates simultaneous pairs of tones to represent each dialed digit.

As well as text messaging and paging systems, the majority of modern telephones are equipped with caller identification ("Caller ID") systems. With Caller ID, data, including the date and time of the telephone call and the calling party's telephone number, is visually displayed to a called party when the called party is already using his or her telephone and unable to answer the call or is otherwise unable to answer the call. Essentially, Caller ID allows a receiving party to receive data from a sending party when the receiving party is engaged in an active call with someone other than the sending party. However, as with existing text messaging and paging systems, Caller ID does not provide a method for callers engaged in a an active telephone call with each other to exchange data in-band.

One of the biggest advantages of telephone communication systems that provide for the exchange of data, such as Caller ID and text messaging systems, is that the transmitted data, unlike verbally communicated information, can be stored on the receiving party's telephone. This ability to store the transmitted data provides the receiving party with the ability to retrieve the stored information from his or her telephone for use at a later time. For example, a party receiving transmitted data in the form of Caller ID can retrieve the Caller ID data of a party whose call he or she missed and call that party back using the number stored on his or her telephone. Similarly, a party receiving a text message on his or her telephone containing an email address can subsequently retrieve the text message and send an email to the email address contained in the stored text message. Additionally, with many modern Caller ID systems, the party receiving a telephone number on his or her telephone as part of the Caller ID data need only pull up the stored telephone number from his or her telephone's memory and press an appropriate button, such as "Talk" or "Dial," and the telephone will automatically call the sent phone number without the receiving party having to dial the number.

As disclosed above, there is, however, no method existing in the art for a caller engaged in an active telephone call to send data in-band to another party during an active telephone. Consequently, there is no existing method by which parties engaged in an active call can transfer and store data.

This deficiency in the art exists even though today more and more people are exchanging more and more information over telecommunication systems. In addition to paging and text messaging systems, computers and many other devices are being connected to the existing telecommunication systems to exchange enormous amounts of data. Moreover, with the widespread use of wireless telephones, telephone communication systems have also expanded so that it is now common for people to exchange information over telephone communication systems while driving their cars, walking between destinations or calling from remote locations far from their home or office.

Because of the greater mobility of telephones provided by wireless technology, there is a need in the art for telephones that provides users with the ability to exchange data in-band during an active call. An example of this need in the art is when a caller during an active call desires to send the person they are engaged in an active call with a telephone number or an email address so that the party receiving the information can contact the telephone number or email address after the telephone conversation. Conventionally, as discussed above, the only method of exchanging information in-band between telephone callers during an active call was verbally. The disadvantage of conventional systems that only allow for verbal information exchange during an active call is that if a party desires to subsequently use the verbally exchanged information, he or she must use some method to record the verbally exchanged information. However, because of the widespread use of wireless telecommunication systems, the party receiving the verbal information may be engaged in the active call while in his or her car, walking down the street or calling from a remote location and may not have access to a method for recording the verbally transmitted information. With existing telephone communication systems, in situations where a recording device is not available or the use of such a device is impracticable, the party receiving the information essentially has no option other than to attempt to memorize the verbal information provided during the telephone call.

BRIEF SUMMARY OF THE INVENTION

The present invention addresses the foregoing deficiencies in the art by providing a system whereby a person engaged in an active telephone call may send data in-band to any other party engaged in the active telephone call. In some embodiments of the present invention the data sent in-band between parties is displayed on a screen on the receiving party's telephone. Further, in other embodiments of the present invention, the data sent to the receiving party during an active call may be stored in the receiving party's telephone so that it can be reviewed and utilized subsequent to the telephone call.

Embodiments of the present invention provide methods for sending data from a sending party's device to a receiving party's device in-band during an active telephone call. In certain embodiments, data to be sent to a receiving party may be entered into the sending party's device and converted into signals that are capable of being transmitted over a telecommunication network. These signals are then transmitted over the telecommunication network in-band with the telephone call to the receiving party. On the receiving party's end, the signals are detected and decoded back into the original data message.

In some embodiments of the present invention, a memory device may be added to the receiving device to store the data sent to the receiving party. A display may also be used on both the receiving and sending devices to provide prompts regarding entering and receiving data and to display the data sent to the sending and receiving parties. Also, in certain embodiments of the present invention, software processing may be used to process alphanumeric data into signals that can be transmitted over the telecommunication network. Similarly, in the receiving device, processing software may be used to process signals received by the device into an easily recognizable alphanumeric form.

In some embodiments of the present invention, the sending device for sending in-band data may include a data entry component for entering data and a converter that converts the entered data into signals that may be transmitted over the telecommunication network. In some embodiments, the data conversion is a single step wherein data inputted into the sending device is directly converted into signals, such as tones that can be transmitted over the data network. In alternative embodiments, the inputted data may be processed by software into digit form that is then, in turn, converted to signals. Prompts to the sending party may be displayed on the sending device telling the sending party how to properly input the desired data. When connected to a telecommunication network, the signals created by the sending device may be transmitted over the network to a party engaged in an active phone call with the sending party.

In certain embodiments of the present invention, the receiving device is capable of detecting signals sent in-band during an active phone call. In these embodiments, a converter may be used in the detecting device to convert any detected signals to a form that is recognizable by the receiving party. In some embodiments of the present invention conversion may simply be a one step conversion process converting signals, such as tones, that are capable of in-band transmission over a telecommunication network, into an alphanumeric message. In other embodiments, the conversion process may be more complex with signals being converted into digits and then processed by software into more complex alphanumeric data.

Additional advantages and features of the present invention are described in greater detail in the detailed description of the invention, the appended drawings and the attached claims.

DETAILED DESCRIPTION OF THE INVENTION

Various embodiments of the present invention provide the ability to send information in-band from one telephone to another over a telephone network during an active call. For purposes of the following figures, the transmission of in-band data is described where the telephone network is a Public-Switched Telephone Network ("PSTN"). The present invention is not, however, limited to such systems and may be adapted for any telephone network.

In one aspect of the present invention, a party engaged in an active call desiring to send data to another party engaged in the active call, may input numeric or textual data that he or she desires to send into his or her telephone using the telephone's keypad. For example, if the sending party desires to send a phone number to the receiving party, he or might press the buttons on the telephone's keypad that correspond to the telephone number. As persons skilled in the art are aware, telephone keypads in the United States have a uniform configuration, as shown below.

As persons skilled in the art are aware, the keys on the telephone keypad correspond to different DTMF tones that are produced by the telephone when the keys on the keypad are pressed. When a key is pressed the two tones which 'cross' at the key are transmitted to the exchange, e.g., dialing a 1 will send 697 Hz and 1209 Hz together, dialing a 2 will send 697 Hz and 1336 Hz and so on. Each digit is represented by a unique combination of tones. A detection time of only 50 ms with an interdigit time of 50 ms means that any digit can be dialed in 100 ms. DTMF tones are in the audible frequency and are designed for transmission over telephone communication systems. Because in some aspects of the present invention an active call is in place between the sending party and the person he or she wishes to send data to, the receiving party, any DTMF tones produced during an active call will be communicated over the telecommunications link between the two callers. The use of DTMF tones as method for in-band data transmission in the present invention is advantageous because it does not require any changes to existing telephone communication networks.

In certain embodiments of the present invention, the receiving party's telephone may be equipped with a DTMF decoder that detects DTMF tones and decodes any DTMF tones received during an active call back into the original data entered into the sending party's telephone. In embodiments of the present invention, DTMF tones detected and decoded by the DTMF decoder during an active call may be stored in a memory device on the receiving party's telephone. Additionally, a display on the receiving party's telephone may be used to display the data sent in-band to the receiving party.

In many embodiments, for convenience and economy, the conventional telephone system architecture may be substantially maintained with only minor changes necessary so that the telephone can receive, decode, and store data transmitted in-band during an active call. With most telephones the changes necessary for in-band data exchange may only be the installation of software and minor hardware. As such, the present invention may be easily retrofitted into existing telephones.

Figure 1:
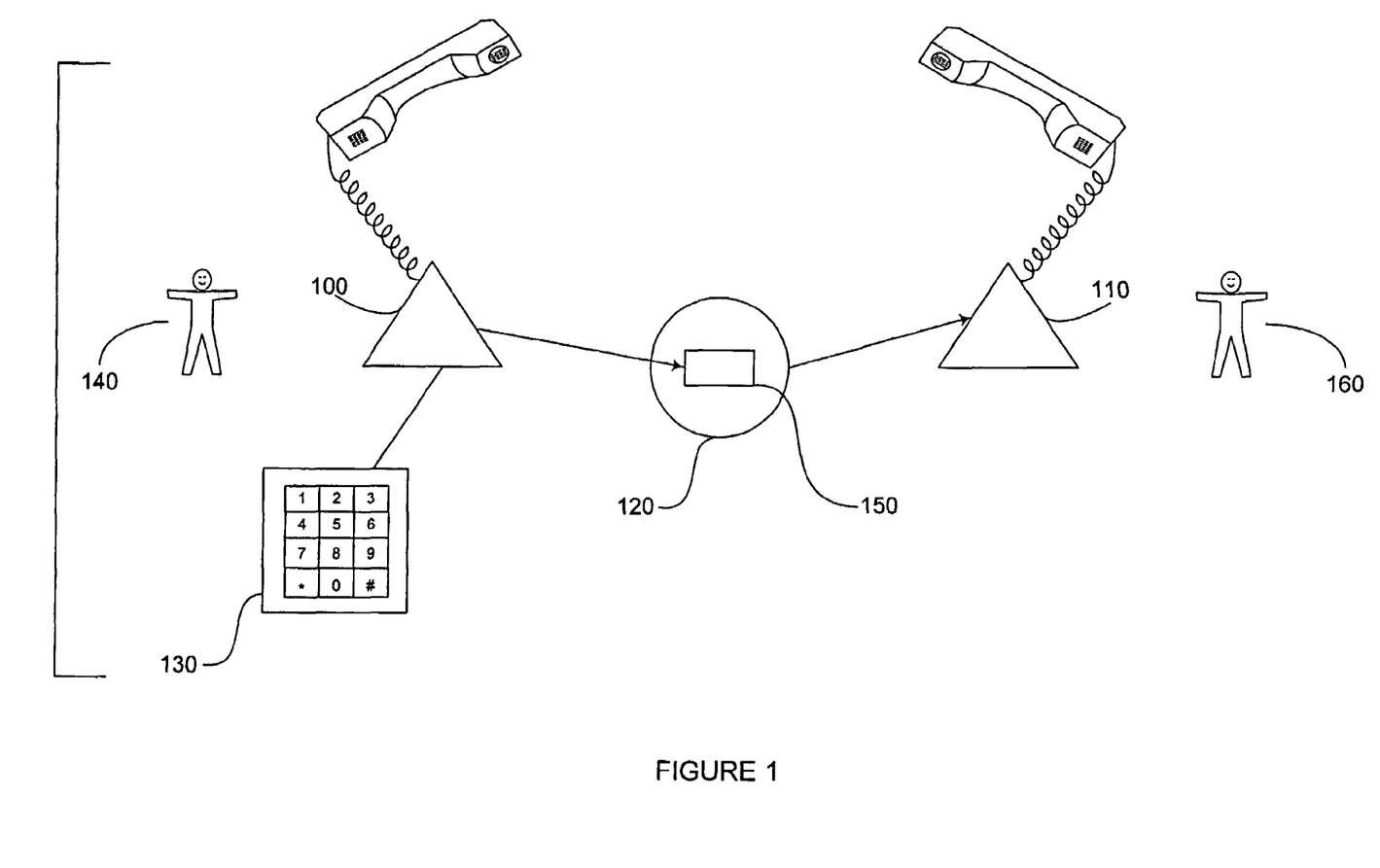
FIG. 1 is a schematic diagram illustrating a conventional telephone system for transmitting verbal information.

FIG. 1 illustrates two telephones, Telephone One 100 and Telephone Two 110, connected over a PSTN 120. As shown in FIG. 1, Telephone One 100 has a Keypad 130. To make a telephone call, the Caller 140 enters the telephone number he or she wishes to contact into the Keypad 130. In a conventional telephone, the numeric telephone number entered into the Keypad 130 is converted into DTMF tones that are transmitted from Telephone One 100 over the PSTN 120 to the Switch 150 where the DTMF tones are decoded and processed and a connection to the telephone number inputted by the caller into the Keypad 130 is made.

In FIG. 1, the Switch 150 has connected Telephone One 100 and Telephone Two 110 and the call is active with both Telephone One 100 and Telephone Two 110 in off-hook modalities. Because the call is active in FIG. 1, the Caller 140 can converse with the person operating Telephone Two 110, the Receiving Party 160. As one skilled in the art is aware, during an active call audible frequency data can be readily communicated between Telephone One 100 and Telephone Two 110. Conventionally, audible frequency data is communicated over the PSTN in the form of verbal communications between the Caller 140 and the Receiving Party 160. In such a conventional telephone communication system, however, there is no method providing for in-band data transmission over the telephone communication system other than by verbal communication between the parties.

In a conventional telephone system, if the Caller 140 enters information into Keypad 130 by pressing a key on Keypad 130 during an active call, a DTMF tone corresponding to the pushed button often is created by Telephone One 100 and the DTMF tone is transmitted over the PSTN 120 to Telephone Two 110. However, in conventional telephone communication systems this ability to transmit DTMF tones inband during an active call has not been harnessed and has, in fact, been treated as a nuisance because accidental contact with the Keypad 130 results in unintelligible noise.

Thus, certain embodiments of the present invention provide a facility for harnessing the ability of telephones to create and send in-band DTMF signals over a telephone communication system during an active call. In other embodiments of the present invention, in-band data may be communicated by methods other than DTMF tones. For example, in an embodiment of the present invention, Telephone 100 may include hardware for creating tones other than DTMF tones. In fact, in an embodiment of the present invention, the telephone may be designed to create tones with high and inaudible frequency ranges of 30 kHz to 1.1 MHz making it possible to transmit voice and data simultaneously in-band during an active call.

Figure 2:
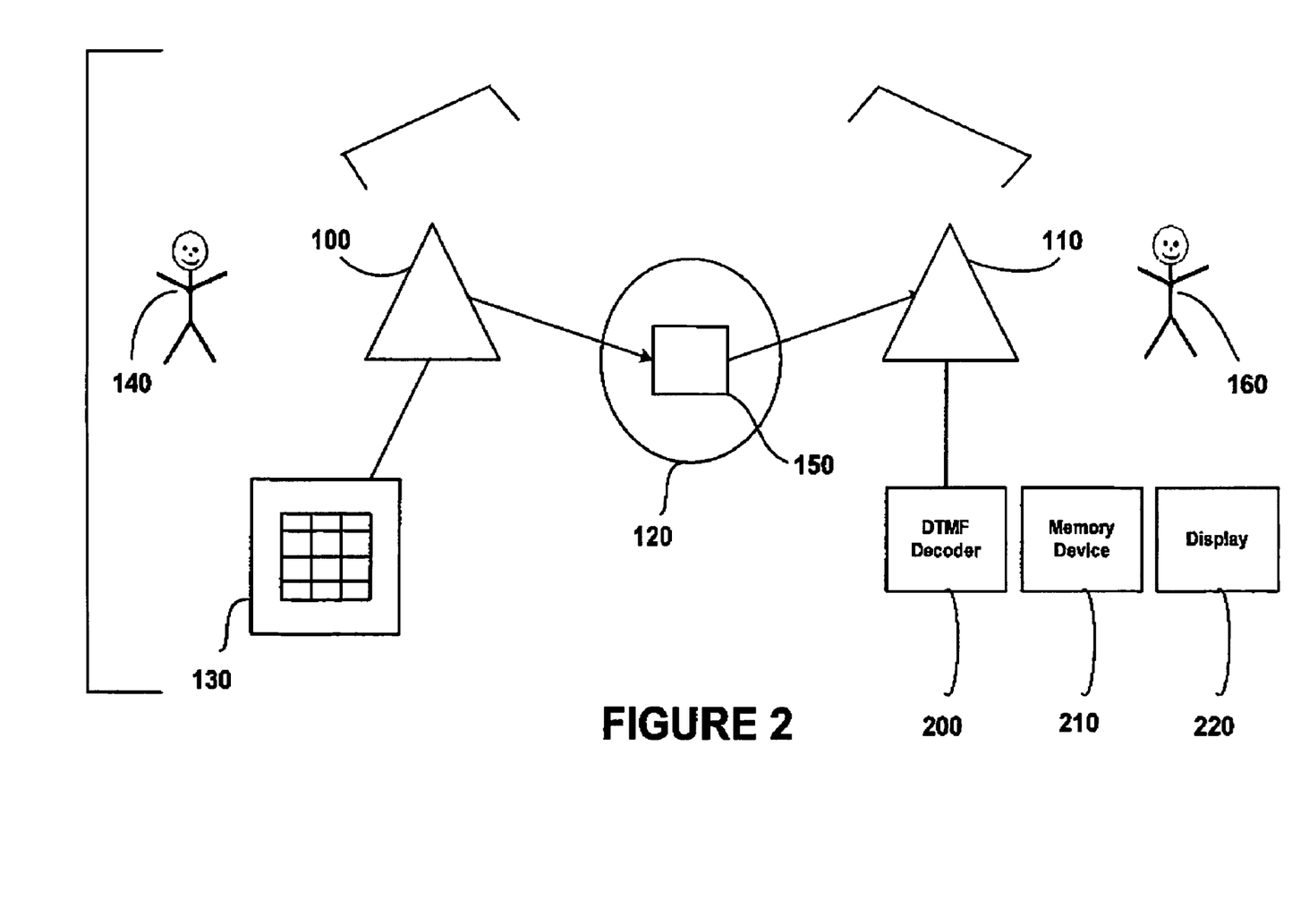
FIG. 2 is a schematic diagram illustrating a telephone communication system for transmitting in-band data according to a preferred embodiment of the present invention.

FIG. 2 illustrates a telephone communication system for transmitting data during an active telephone call according to a preferred embodiment of the present invention.

In FIG. 2, as in the conventional telephone connection illustrated in FIG. 1, Telephone One 100 is connected via a PSTN 120 to Telephone Two 110. In one embodiment of the present invention, the telephone used to send data, Telephone One 100, needs no modification. In this embodiment, the Caller 140 presses the appropriate keys on the Keypad 130 corresponding to the data he or she desires to communicate to the receiving party. By pressing the keys on the Keypad 130, DTMF tones are created and are communicated over the PSTN 120 to Telephone Two 110. However, in such an embodiment, it is difficult for the Caller 140 to send anything but rudimentary data, such as a telephone number. Hence, in another embodiment of the present invention, Telephone One 100 contains processing software that is capable of creating a "data message" by prompting the Caller 140 as to what information needs to be inputted and formatting this inputted data into a message that can be decoded by similar software on Telephone Two 110. The processing software in other embodiments of the present invention prompts the Caller 140 to disclose the type of data being communicated and creates a check sum of the amount of data being sent. As persons skilled in the art are aware, most modern telephones contain microprocessors and the necessary processing software may easily be installed and run on these microprocessors perhaps as a Java applet, native application, etc.

In certain embodiments of the present invention, Telephone Two 110 is connected to a DTMF Decoder 200. The DTMF Decoder 200 is connected to the PSTN 120 via Telephone Two 110 and detects and decodes any DTMF tones transmitted to Telephone Two 110. As one skilled in the art is aware, DTMF decoders are common devices in the telecommunications industry and are available from numerous different manufacturers, including Motron Electronics of Eugene, Oreg., and Optoelectronics of Fort Lauderdale, Fla.

In specific embodiments of the present invention, Telephone Two 110 contains a Memory Device 210 that is connected to the DTMF Decoder 200. The Memory Device of these embodiments is a microprocessor that processes and stores any data decoded by the DTMF Decoder 200. In an alternative embodiment of the present invention, the Memory Device 210 also stores any DTMF tones transmitted to Telephone Two 110 prior to the DTMF tones being decoded by the DTMF Decoder 200 to prevent any potential loss of data.

In a other embodiments of the present invention, the Memory Device 210 is a microprocessor with storage that stores the data decoded by the DTMF Decoder 200 so that the Receiving Party 160 can retrieve the transmitted data subsequent to the telephone call. Additionally, in an embodiment of the present invention, Telephone Two 110 contains processing software that is able to process the digits produced by the DTMF Decoder 200 to reproduce the data entered by the Caller 140 in a format that is easily understood by the receiving party. As discussed above, processing software may be installed and run on microprocessors existing in current telephones and wireless phones.

In particular embodiments of the present invention, the Memory Device 210 is connected to a Display 220 on which the transmitted data is displayed to the caller. As one skilled in the art will appreciate, many modern telephones, including wireless phones, may include a microprocessor and/or a display. As such, for efficiency and ease of use, the existing components found on the telephone may be modified for use in the present invention. In this way, embodiments of the present invention may be easily retrofitted onto existing telephones and wireless phones.

Figure 3:
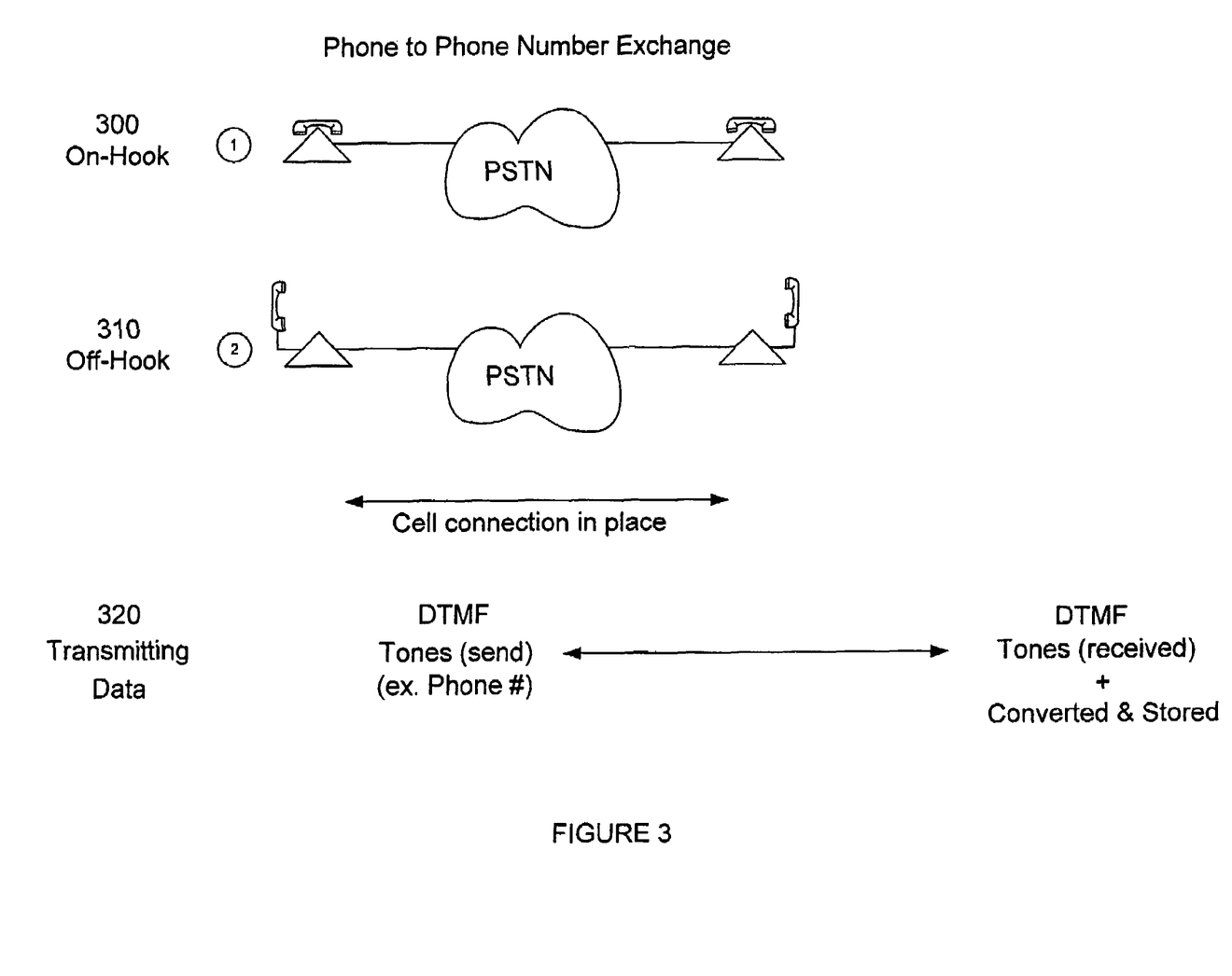
FIG. 3 is a flow diagram illustrating the transfer of data in-band during an active telephone call in a preferred embodiment of the present invention.

FIG. 3 is a flow schematic illustrating step by step how information is exchanged in a preferred embodiment of the present invention.

Step 300 On-Hook, Telephone One 100 and Telephone Two 110 are both connected to the PSTN 120 and at this time neither of the telephones is in use.

Step 310 Off-Hook, a Caller 140 using Telephone One 110 is actively engaged in a telephone call, via PSTN 120, with a Receiving Party 160 who is using Telephone Two 110.

Step 320 Transmitting Data, Caller 140 enters information into Telephone One 100 by pressing the keys on the Keypad 130 of Telephone One 100. In some cases, when Caller 140 presses the keys on Keypad 130, DTMF tones corresponding to the pressed keys are generated by Telephone One 100 and are communicated over the PSTN 120 to Telephone Two 110. In other cases, the data entered by the Caller 140 is not directly converted into DTMF tones; instead processing software in Telephone One 100 converts the data inputted by Caller 140 into Telephone One 100 into a data message, which is then converted into DTMF tones that are communicated over the PSTN 120 to Telephone Two 110. The DTMF tones may be received by the Second Telephone 110 and/or converted by the DTMF Decoder 200 into digits. The digits produced by the DTMF Decoder are stored in Memory Device 210 and displayed on Display 220 on the Second Telephone 110. In a particular embodiment of the present invention, the digits produced by the DTMF Decoder 200 are processed by processing software into alphanumeric data that is easily comprehended by the receiving party and this alphanumeric data is stored in Memory Device 210 and displayed on Display 220.

Various message formats and protocols may be used to communicate data between telephones. Merely by way of example, in some embodiments, the structure of the data message sent between the telephones is as follows: DIGIT # DATA SIZE # DATA STREAM. In this embodiment: the "#" sign is a data separator; "Digit" represents the type of information being sent; "Data Size" is a decimal number for the amount of data that is being sent; and the "Data Stream" is the data being sent.

In a particular aspect of some embodiments, "Digit" represents the type of information being sent as represented in the table below.

| DIGIT | INFORMATION TYPE |
|---|---|
| 1 | My Telephone Number |
| 2 | A Telephone Number |
| 3 | My GPS Coordinates |
| 4 | My Email Address |
| 5 | My Address |
| 6 | An Address |
| 7 | User Defined |
| . | |
| . | |
| . | |
| 100 | System Defined |

If desired, the table illustrated above can be built into the processing software of Telephone One 100 to provide a prompt to Caller 140. Hence, in some cases, Caller 140 may select the type of information being sent, for example, if Caller 140 desires to send Receiving Party 160 his telephone number during an active call he will begin the process of sending in-band data by pressing the one (1) key on Keypad 130 of Telephone One 100. Alternatively, if Caller 140 desires to send a different telephone number, he or she will press key two (2) on the Keypad 130 of Telephone One 100.

In the data message, "Data Size" can be any numeric representation for the amount of data being sent by Caller One 140. Merely by way of example, "Data Size" can be a binary or hexadecimal number. In particular cases, "Data Size" can be decimal numbers. In an embodiment of the current invention, "Data Size" can be a number between one (1) and one hundred (100). "Data Size" serves as a checksum on the data being sent so the processing software in Telephone Two 110 can perform a check to determine whether all data was successfully transmitted and communicate with Telephone One 100 if the data transmission is not complete.

In the data message, "Data Stream" may comprise the actual data being sent by Caller 140. In some embodiments of the present invention, the data stream consists of a series of digits where the digits may be any digits found on a standard phone keypad—Arabic numerals 0 to 9 and the "#" and "*" signs. Each of these digits has a corresponding DTMF tone associated with it, and to transmit the data stream over the PSTN the digits are converted to their corresponding DTMF tones. As illustrated in FIG. 2, the DTMF tones are received by Telephone Two 110 and converted by a DTMF Decoder 200 back to digits. In a particular embodiment of the present invention, a two step process may be used whereby characters are converted to digits prior to being converted to DTMF tones. The type of information being sent will determine whether this two step conversion process is used. For example, if Caller 140 desires to send an email address or a street address, the characters of the address can be converted to digits that are then converted to DTMF tones. In turn, on the receiving telephone, Telephone Two 110, the DTMF tones are converted back to digits by the DTMF Decoder 200 and then converted from digits to characters. It is possible to send textual data, such as email and street addresses, using the present invention since DTMF systems can generate 16 characters, denoted as 1 . . . 9, *, 0, #, A . . . D and the A to D codes can be used as shift codes to enlarge the code set to 60.

In some aspects of the invention, email addresses and street addresses stored on a telephone's memory may be selected by Caller 140 and converted by applicable software into digits that are then converted into DTMF tones and sent to Telephone Two 110 where they are decoded by the DTMF Decoder 200 and processing software. Alternatively, Caller 140 can spell out an entry by pushing the keys on Keypad 130 of Telephone One 100, for example after Caller 140 enters digit four (4) followed by the # button, a system according to various embodiments can recognize that the caller is sending data that contains letters, an email address. Methods for inputting textual data using telephone keys are well known in the art. For example, with automatic call processing systems, a person can enter textual information by pressing the keys on the telephone keypad corresponding to the letters denoted above the key. For example, pressing the number two (2) key on a telephone keypad once corresponds to the letter A, since the letters ABC are located above the number two key on a standard telephone keypad; pressing the number two (2) key on a telephone keypad twice corresponds to the letter B; and pressing the number two (2) key on a telephone keypad three times corresponds to the letter C, and so on. Alternatively, the telephone may be equipped with an alphanumeric keypad, voice recognition software, etc.

Figure 4:
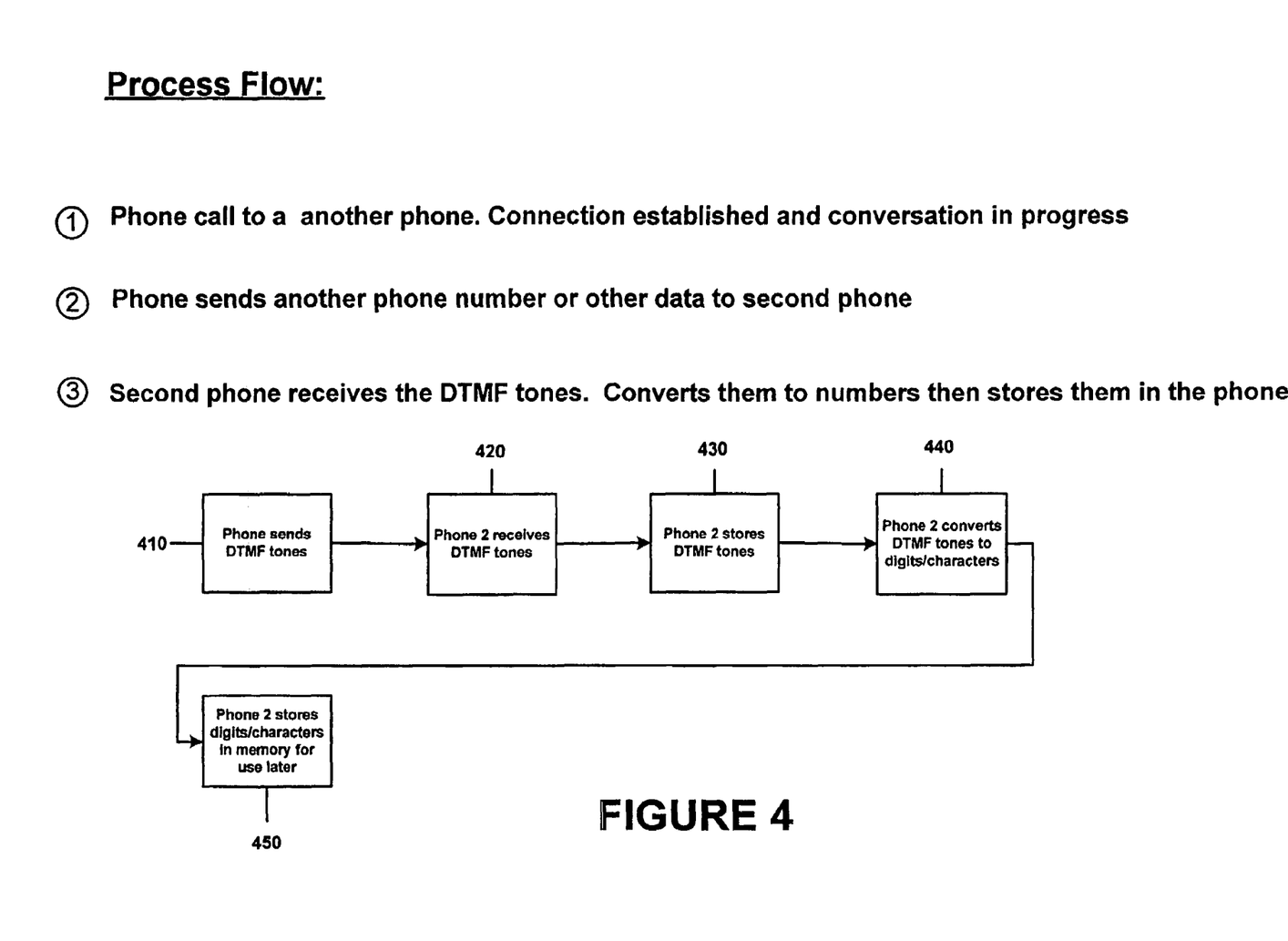
FIG. 4 is a flow diagram illustrating the series of events when data is sent in-band from one caller to the other during an active call in a preferred embodiment of the present invention.

In FIG. 4 the flow of information is illustrated in a flow chart in accordance with some embodiments of the present invention. The flow chart represents the flow of data during an active call.

410 Transmission, Telephone One 100 generates DTMF tones that are communicated over the telephone network. As persons skilled in the art are aware, modern telephones incorporate a DTMF tone generator.

420 Reception, Telephone Two 110 receives the DTMF tones generated and sent by Telephone One 100. DTMF tones are audible frequency tones that are designed for communication over a telephone network. As such, the DTMF tones produced by Telephone One 100 during an active call pass over the telephone network where they are then detected by Telephone Two 110.

430 DTMF Tone Storage, a Memory Device 210 associated with Telephone Two 110 stores the DTMF tones sent by Telephone One 100.

440 Conversion, DTMF Decoder 200 integrated in Telephone Two 110 converts the DTMF tones to digits. In a preferred embodiment of the present invention, processing software converts the digits into alphanumeric data.

450 Data Storage, Memory Device 210 integrated in Telephone Two 110 stores the transmitted data.

While the method 400 described above specifically references DTMF tones, one skilled in the art will appreciate, based on the disclosure herein, that similar methods could be used for other in-band signaling schemes as well.

The invention has now been described in detail. All references cited above are hereby incorporated by reference. Further, it will be appreciated that various modifications and changes may be made without departing from the invention. Therefore, the scope and content of this invention are not limited by the foregoing description. Rather, the scope and content are to be defined by the following claims.

What is claimed is:

1. A method for sending a data message from a sending party's device to a receiving party's device over a telecommunication network during an active telephone call, comprising the steps of:

providing a display prompt on said sending party's device during an active call, said display prompt associating a first keypad digit with a telephone number of said sending party, a second keypad digit with GPS coordinates of said sending party's device, and a third keypad digit with an email address of said sending party;

receiving an input selection of a keypad digit in response to said display prompt, said selected keypad digit associated with an information type comprising said telephone number of said sending party, said GPS coordinates of said sending party's device, or said email address of said sending party;

providing said data message comprising said selected information type for said sending party's device;

converting said data message inputted into said sending party's device into signals; and transmitting said signals in-band over said telecommunication network to said receiving party's device, wherein said sending party's device and said receiving party's device are connected in said active telephone call, and wherein said signals are reconverted into said data message by said receiving party's device during said active telephone call.

2. The method of claim 1 further comprising the step of: storing said data message in said receiving party's device.

3. The method of claim 1 further comprising the step of: displaying said data message on a display on said receiving party's device.

4. The method of claim 1, wherein said signals further comprise dual-tone multi frequency tones.

5. The method of claim 1, wherein said sending party's device is a telephone.

6. The method of claim 1, wherein said receiving party's device is a telephone.

7. The method of claim 1, wherein said sending party's device is a wireless phone.

8. The method of claim 1, wherein said receiving party's device is a wireless phone.

9. A method for sending a data message from a sending party's device to a receiving party's device over a telecommunication network during an active telephone call, comprising the steps of:

providing a display prompt on said sending party's device during an active call, said display prompt associating a first keypad digit with a telephone number of said sending party, a second keypad digit with GPS coordinates of said sending party's device, and a third keypad digit with an email address of said sending party;

receiving an input selection of a keypad digit in response to said display prompt, said selected keypad digit associated with an information type comprising said telephone number of said sending party, said GPS coordinates of said sending party's device, or said email address of said sending party;

providing said data message comprising said selected information type for said sending party's device, wherein said data message includes a field comprising a data size of said data message, said data size serving as a checksum;

converting said data message inputted into said sending party's device into signals;

transmitting said signals in-band over said telecommunication network to said receiving party's device, wherein said sending party's device and said receiving party's device are connected in said active telephone call;

storing said signals received by said receiving party's device;

reconverting said signals into said data message; and processing said field comprising said data size to check to determine whether all data was successfully received.

10. The method of claim 9 further comprising the step of: storing said data message in said receiving party's device.

11. The method of claim 9 further comprising the step of: displaying said data message on a display on said receiving party's device.

12. The method of claim 9, wherein said sending party's device is a telephone.

13. The method of claim 9, wherein said receiving party's device is a telephone.

14. The method of claim 9, wherein said sending party's device is a wireless phone.

15. The method of claim 9, wherein said receiving party's device is a wireless phone.

16. A method for sending original information from a sending party's device to a receiving party's device over a telecommunication network during an active telephone call, comprising the steps of:
   providing a display prompt on said sending party's device during an active call, said display prompt associating a first keypad digit with a telephone number of said sending party, a second keypad digit with GPS coordinates of said sending party's device, and a third keypad digit with an email address of said sending party;
   receiving an input selection of a keypad digit in response to said display prompt, said selected keypad digit associated with an information type comprising said telephone number of said sending party, said GPS coordinates of said sending party's device, or said email address of said sending party;
   retrieving said original information comprising said selected information type from information stored in said sending party's device;
   converting said original information into signals comprising non dual-tone multi-frequency tones;
   transmitting said signals in-band over said telecommunication network to said receiving party's device, wherein said sending party's device and said receiving party's device are connected in said active telephone call; and
   reconverting said signals in said receiving party's device into said original information.

17. The method of claim 16 further comprising the step of: storing said original information in said receiving party's device.

18. The method of claim 16 further comprising the step of: displaying said original information on said receiving party's device.

19. The method of claim 16, wherein said sending party's device is a telephone.

20. The method of claim 16, wherein said receiving party's device is a telephone.

21. The method of claim 16, wherein said sending party's device is a wireless phone.

22. The method of claim 16, wherein said receiving party's device is a wireless phone.

23. A method for sending alphanumeric data from a sending party's device to a receiving party's device over a telecommunication network during an active telephone call, comprising the steps of:
   providing a display prompt on said sending party's device during an active call, said display prompt associating a first keypad digit with a telephone number of said sending party, a second keypad digit with GPS coordinates of said sending party's device, and a third keypad digit with an email address of said sending party;
   receiving an input selection of a keypad digit in response to said display prompt, said selected keypad digit associated with an information type comprising said telephone number of said sending party, said GPS coordinates of said sending party's device, or said email address of said sending party;
   providing said alphanumeric data for said sending party's device, said alphanumeric data comprising said information type associated with said selected keypad digit;
   translating said alphanumeric data inputted into said sending party's device into digits;
   converting said digits into signals;
   transmitting said signals in-band over said telecommunication network to said receiving party's device, wherein said sending party's device and said receiving party's device are connected in said active telephone call;
   retranslating said signals into said digits; and
   reconverting said digits into said alphanumeric data.

24. The method of claim 23 further comprising the step of: storing said alphanumeric data in said receiving party's device.

25. The method of claim 23 further comprising the step of: displaying said alphanumeric data on a display on said receiving party's device.

26. The method of claim 23, wherein said signals further comprise dual-tone multi frequency tones.

27. The method of claim 23, wherein said sending party's device is a telephone.

28. The method of claim 23, wherein said receiving party's device is a telephone.

29. The method of claim 23, wherein said sending party's device is a wireless phone.

30. The method of claim 23, wherein said receiving party's device is a wireless phone.

31. A method for sending a data message over a telecommunication network during an active telephone call, comprising the steps of:
   providing a display prompt on a caller's device during an active call, said display prompt associating a first keypad digit with a telephone number of said caller, a second keypad digit with GPS coordinates of said caller's device, and a third keypad digit with an email address of said caller;
   receiving an input selection of a keypad digit in response to said display prompt, said selected keypad digit associated with an information type comprising said telephone number of said caller, said GPS coordinates of said caller's device, or said email address of said caller;
   providing said data message comprising said selected information type for a device, wherein said data message includes a field comprising a data size of said data message, said data size serving as a checksum;
   converting said data message into non dual-tone multi-frequency signals;
   inputting said signals into said telecommunication network;
   transmitting said signals in-band over said telecommunications network during said active telephone call;
   receiving said signals sent in-band over said telecommunications network during said active telephone call; and
   processing the field comprising the data size to check to determine whether all data was successfully received.

32. The method of claim 31, wherein said data message is inputted into said telecommunication system by a sending device.

33. The method of claim 31, wherein said data message is received by a receiving device.

34. A sending device for sending a data message over a telecommunication network during an active telephone call, comprising:
   a display integrated with said sending device and configured to display a prompt when said device is engaged in an active call, said prompt associating a first keypad digit with a telephone number of a sending party, a second keypad digit with GPS coordinates of said sending device, and a third keypad digit with an email address of said sending party;
   a keypad communicatively coupled with said display and configured to receive an input selection of a keypad digit in response to said display prompt, said selected keypad digit associated with an information type comprising said telephone number of said sending party, said GPS coordinates of said sending device, or said email address of said sending party;
   a converter communicatively coupled with said keypad and configured to convert said data message comprising said selected information type into signals, wherein said signals are capable of being transmitted over a telecommunication network; and
   a connector connecting said converter to said telecommunication network, wherein said signals created by said converter are sent in-band through said connector during said active telephone call to said telecommunication network.

35. The sending device of claim 34, further comprising:
   a display connected to said keypad, wherein said display displays information regarding entering said data message into said keypad.

36. The sending device of claim 34 wherein said connector is a telephone.

37. The sending device of claim 34 wherein said connector is a wireless telephone.

* * * * *